United States Patent
Dean, Jr. et al.

(10) Patent No.: US 7,380,918 B2
(45) Date of Patent: Jun. 3, 2008

(54) METHOD AND APPARATUS FOR FORMING HIGH-SPEED LIQUID

(75) Inventors: Robert Dean, Jr., Norwich, VT (US);
David F. Nelson, Lebanon, NH (US);
Matthew L. Brown, Watertown, MA (US); Richard W. Couch, Hanover, NH (US); Mark W. Blanchard, Orford, NH (US)

(73) Assignee: Synergy Innovations, Inc., Lebanon, NH (US)

( * ) Notice: Subject to any disclaimer, the term of this patent is extended or adjusted under 35 U.S.C. 154(b) by 343 days.

(21) Appl. No.: 11/075,833

(22) Filed: Feb. 22, 2005

(65) Prior Publication Data

US 2006/0187277 A1    Aug. 24, 2006

(51) Int. Cl.
*B41J 2/105* (2006.01)
(52) U.S. Cl. .................................................. 347/82
(58) Field of Classification Search ............... 347/1, 347/82; 75/331, 335, 336, 338, 340
See application file for complete search history.

(56) References Cited

U.S. PATENT DOCUMENTS

| 4,733,247 A | * | 3/1988 | Arai et al. .............. 347/200 |
| 5,266,098 A | * | 11/1993 | Chun et al. .............. 75/335 |
| 7,097,687 B2 | | 8/2006 | Chow .................... 75/336 |

* cited by examiner

*Primary Examiner*—K. Feggins
(74) *Attorney, Agent, or Firm*—Bourque and Associates (57) ABSTRACT

A method and apparatus for forming high-speed water droplets takes advantage on a synergy of features disclosed by the present invention including a low Weber number in a chamber in which a liquid stream breaks up into droplets; a reduced break up distance for forming the water droplets by introducing turbulence into the liquid source, thereby providing a unit or tool that is of practical size; accomplishing the generation of high-speed water droplets without using a complex driver; reducing the liquid's surface tension thereby facilitating the creating of near spherical droplets; and maintaining the droplets in form until they strike the surface of a workpiece.

44 Claims, 6 Drawing Sheets

METHOD AND APPARATUS FOR FORMING HIGH-SPEED LIQUID

FIELD OF THE INVENTION

The present invention relates to the formation of liquid droplets, and more particularly, to a method and apparatus for forming high speed liquid droplets which are used to impact a work piece for such purposes as, cleaning a work piece, stripping paint and rust from a work piece, profiling or roughening surfaces, as well as cutting, machining, and peening.

BACKGROUND

The formation and use of streams of liquid propelled by very high pressure to very high speeds is well known in the industry. Such streams are used for cleaning surfaces of dirt and contaminants and for removing coatings such as paint. Some researchers have noted that non-steady streams are more effective than steady streams for these applications. In non-steady applications, the stream is broken up into slugs or drops. See, for example, U.S. Pat. No. 3,983,740 incorporated herein by reference.

The prior art in this area of technology has suffered from several drawbacks including, but not limited to, the need to use a complex driver, such as a high frequency ultrasonic generator, or the like, for causing formation of the slugs or drops. Further, without a driver, other prior art devices are unsuitable for commercial exploitation due to the fact that the distance required for a stream of liquid to break up into drops is too long to provide a commercially usable device.

SUMMARY OF THE INVENTION

The present invention includes a process to create near-spherical liquid drops (sometime termed slugs) that, on impact with a relatively-hard surface, generate internal pressure waves because the oblique-angle point of contact between the drop and the near flat surface moves at a velocity greater than the speed of sound in the liquid. The pressure waves so generated increase the drop impact pressure to be several times the water hammer pressure=$\rho_l c_l V_d$ where: $\rho_l$=liquid density, $c_l$=speed of sound in liquid and $V_d$=drop impact velocity. The intensified pressure is employed to drill, cut, clean, strip, impregnate and/or profile the substrate surface better than can be achieved by a jet of the liquid.

DESCRIPTION OF THE DRAWINGS

These and other features and advantages of the present invention will be better understood by reading the following detailed description, taken together with the drawings wherein.

DESCRIPTION OF THE INVENTION

The present invention features a method and apparatus for advantageously exploiting liquid drop impact technology in a practical, economical apparatus for cleaning surfaces, stripping paint and rust from the surface of an object such as a ship, and structural steel and for profiling, roughening or otherwise conditioning surfaces of an object. The present invention is particularly suitable to replace abrasive grit blasting. The present invention accomplishes the same task much more quickly and, in addition, any hazardous wastes are easily recovered by providing a suction at the area in which the liquid drops impact the work surface to recover both the liquid as well as any removed paint, rust, metal, or other workpiece debris.

The present invention includes at least four features, which, either alone or in combination, are disclosed herein and serve to accomplish the goals of the present invention. These features include: 1) the providing of a low Weber number within the apparatus; 2) providing an apparatus which reduces the distance required for a stream or sheet of liquid to break up into generally uniformly spaced droplets; 3) providing an apparatus wherein no external driver is required to break the liquid stream or sheet into droplets; and 4) adjusting the surface tension of the incoming liquid used to from the liquid droplets by various methods including incoming liquid perturbation and the addition of various materials to the incoming liquid. The inventors of the present invention have discovered that merely making liquid droplets is not enough. The droplets must remain essentially intact until they strike the work substrate. Near spherical drops at impact are preferred, although non-spherical drops or slugs of liquid also can be more effective than a simple, unbroken jet of liquid.

The method and apparatus of the present invention creates a low Weber number (We) by using one or more of the following characteristics: using small diameter jets or thin sheets; providing a low pressure (i.e. vacuum) in a droplet-forming chamber; providing a gas flow co-linear with the liquid droplets; providing an atmosphere around the jet or sheet comprised of a low molecular weight gas or gas mixture; providing an atmosphere around the jet or sheet comprised of a gas at elevated temperature.

Low Weber Number (We)

"We" is a non-dimensional parameter common to atomization technology. It is the ratio of the drag forces from the atmosphere surrounding the liquid jet (hereinafter "jet" is understood to mean jet or sheet and "diameter" is understood to mean diameter or thickness) that try to breakup/disrupt the jet, to the liquid surface-tension forces that resist breakup of the jet according to the formula:

$$We_j = \rho_a V_{rel}^2 d_j / \sigma_j \tag{1}$$

Where: $\rho_a$=density of atmosphere surrounding the jet
$V_{rel}$=relative velocity=$(V_j - V_a)$
$V_j$=velocity of the jet
$V_a$=velocity of surrounding atmosphere in the direction of the jet
$d_j$=jet diameter and $\sigma_j$=surface tension of the jet liquid (against the surrounding atmosphere)

Any liquid jet with a non-zero surface tension, given enough time, will break up into droplets given the phenomenon of surface-tension-driven Rayleigh instability as first described by Lord Raleigh in 1873. In order to allow enough time for a high-speed liquid jet to break up into a train of high-speed drops that can impact a work piece, one must prevent atmospheric drag from atomizing the jet and drops into an ineffective mist before they reach the work.

To prevent atomization, We$_j$ must be made low, preferably <500.

Inspecting Equation (1) reveals the possible modifications of the jet flow situation.

Make: $\rho_a$ low
  $V_{rel}$ low
  $d_j$ small
  $\sigma_j$ large

Accordingly, the present invention is primarily concerned with water jets with $\sigma_j \cong 70$ mN/m. There is no practical way known to raise $\sigma_j$ of water.

$d_j$ can be made as small as is practical in application. The inventors have used jets with diameters as small as 50 µm. With proper filtering of the fluid used, even smaller jets can be employed.

The surrounding atmosphere density, $\rho_a$, can be lowered by lowering gas pressure, $p_a$, (i.e., vacuum) and/or gas molecular weight MW$_g$ (e.g., MW$_{Helium}$=4 compared to MW$_{air}\cong 29$) and/or raising gas temperature T$_g$. $\rho_a$ is proportional to $(p_a \times MW_g)/T_a$.

$V_{rel}$ can be lowered, for a fixed $V_j$, by increasing $V_a$; that is, use a surrounding, co-linear gas flow (i.e., a shield).

Accordingly, the present invention may use one or more of the three known factors affecting Weber number: Pa (affected by: pressure (or vacuum), gas molecular weight, and increased gas temperature); $V_{rel}$ (affected by co-linear gas flow and jet velocity); and $d_j$; to create a low Weber number. Examples may be found on the following table:

Reduce Breakup Distance

The second feature of the present invention is to reduce the distance required for the liquid drops to form. A certain time of flight is necessary for a drop train to form. The smaller the $d_j$ (and hence drop diameter $d_d$) the shorter the breakup time, $t_b$. The lower the jet liquid viscosity and/or density, the shorter $t_b$. The higher the surface tension $\sigma_j$, the shorter $t_b$.

As mentioned above, $d_j$ can be reduced to a practical limit which will lead to a reduced breakup distance. For a given liquid, it is often impractical to reduce viscosity or decrease density because this is usually effected by the use of additives which are often unacceptable to the industry due to price and/or surface contamination concerns. For this same reason, it is often impractical to increase the surface tension of a given liquid.

As an alternative to varying the parameters listed above, it is also well known in the art that oscillating the jet, in various ways, reduces $t_b$. In round jets, the most powerful oscillation frequency, $f_1$, corresponds to the Rayleigh geometry:

$$f_1 = V_j/S_d \cong V_j/4d_j \quad (2)$$

Where: $S_d$=drop spacing (in length dimensions)

Much research has gone into such oscillation because it tends to give a stable drop train.

To provide a practical apparatus as we know it now, however, $f_1$ is high. For example, the inventors have been using round jets with $V_j \cong 600$ m/s and $d_j \cong 75$ µm, so: $f_1 = 600/(4 \times 75 \times 10^{-6}) = 2 \times 10^6 = 2$ MHz. The driving pressure to make $V_j$=600 m/s is given by Bernoulli's equation as $p_o$=180 MPa$\cong$25,000 psi.

This needed combination of $f_1$ and $p_o$ eliminates all means presently known in the art to drive oscillation of the jet. There is, however, another option, which is to use the random liquid fluctuations of turbulence. The present invention employs tailored turbulence in the approaching flow, upstream of the jet nozzle, as high-frequency "white noise" (i.e. no characteristic frequency). The jet breaking up into the Rayleigh pattern picks up $f_1$ from the broad spectrum of frequencies offered by turbulence, and responds by exhibiting a reduced $t_b$.

However, if too strong turbulence is introduced, the jet will be over-excited at non-preferred frequencies, causing the jet to atomize into an ineffective mist before the drop train forms.

The inventors have used experimental means to find the correct Reynolds number (a non-dimensional parameter of fluid flow well known and understood by those skilled in the art) for fully-developed flow upstream of the jet nozzle that creates optimum turbulence, which makes $t_b$ minimum. Their findings agree with other researchers in the field[+]. This is the second (2) feature of the present invention. A low $t_b$ is a practical necessity to provide a tool of reasonable and manageable length. Accordingly, the length of the breakup distance, $l_b$, and hence of a large segment of the tool, is given by:

$$l_b = V_j t_b \tag{3}$$

[+]Eroglu, Hasan, Chigier, Norman, Farago and Zoltan; *Coaxial atomizer liquid intact lengths*; Pys. Fluids, 3(2), 303-308; 1991.

The present invention features a mechanism and method to create a train of high-speed, droplets or slugs FIGS. **4*a*-4*d*, from a high-speed liquid jet whereby a perturbation of the high-speed jet's velocity $V_j$ is imposed so that alternate sections of the jet coalesce to form drops, and where the jet velocity perturbation is caused by a pressure perturbation in a plenum or region upstream of the jet-forming nozzle(s), FIGS. 5 and 6. The pressure perturbation is generated by a standing pressure wave 50 in the plenum having a pressure anti-node 52 near the jet nozzle entry 54, and where the standing pressure wave is driven, that is supplied with energy, from a side-branching resonator 60, FIG. 5 located near a velocity antinode of the standing pressure wave in the plenum in the side branching resonator or a center resonator 80, FIG. 6**.

Flow that in turn is driven by oscillations of an exit jet 62 from the side-branch or center resonator through an orifice creating a submerged discharge jet 64 in an adjacent liquid-filled chamber 66 to make a Strouhal number $St = dj_2/Vj_2\ \lambda_2$ (where $dj_2$=diameter jet and $Vj_2$=velocity of said jet and $\lambda_2$=wave length of the standing wave in the side-branch resonator) of $0.3 \leqq St \leqq 0.5$.

The exit jet 64 discharges into a second chamber full of the liquid 66 and having its internal pressure adjusted and controlled by a throttling valve 68 communicating to the environment or to a drain. The second chamber's 66 pressure cooperates with the side-branch or center resonator's internal pressure to determine the jet velocity $Vj_2$. The wave length $\lambda_2$ is established by the length of the side-branch resonator viz $\lambda_2=n/2$ where n is an odd, whole number so that a velocity antinode exists at the plenum end of the side-branch resonator and a pressure antinode at the exit nozzle of said side-branch resonator.

The present invention also includes a method to hasten the surface-tension formation of drops from a jet by controlling the turbulence intensity and/or scale in the fluid upstream of the jet-forming nozzle. This may be accomplished by setting the Reynolds Number upstream of the jet-forming nozzle=$\rho_l V_l d/\mu_l$ (where: $V_l$ is the fluid velocity relative to the walls of said upstream passage, d is the characteristic dimension of said passage and $\mu_l$ is the viscosity or apparent viscosity of the fluid in said upstream passage) and the passage length to preferred values that increase the rate of surface-tension action without unduly increasing the atomization action of the gas surrounding the jet.

Setting of the upstream Reynolds Number to a preferred value may be accomplished partly by altering the fluid's apparent viscosity by addition of long-chain polymers, for example. Setting of the upstream Reynolds Number to a preferred value may also be accomplished partly by altering the fluid's apparent density by, for example, forming a multi-phase fluid with solids entrained from addition of a fine material such as silica, metal or ceramic, or by adding gas bubbles.

A preferred velocity profile in the jet issuing from the nozzle may be created such that relaxation of the velocity profile, which occurs naturally in the jet, enhances the surface-tension breakup of the jet into droplets may also be accomplished. Further, the length, diameter and Reynolds Number of the passage upstream of the nozzle are chosen to create the preferred emergent jet velocity profile. Configuring the bore, entry and exit geometry of the jet-forming nozzle to produce a preferred, emergent jet geometry that enhances the rate of surface-tension breakup of the jet into drops may also be accomplished and is contemplated by the present invention.

The invention includes apparatus and methods to excite pressure and/or velocity oscillations at the entry of the jet-forming nozzle by means which can vary the flow rate through the nozzle such as piezocrystal-created pressure waves, spark-discharge pressure waves, gas bubble or solid or gel inclusions in the upstream flow or supply. Further, means to excite pressure and/or velocity oscillations at the entry of the jet-forming nozzle include means such as periodic geometrical oscillations of the geometry of the upstream plenum and/or nozzle elements contacting the flow, vibrating in space the upstream plenum and/or nozzle to create inertial forces on the fluid.

Methods such as pulsed laser radiation on the jet to alter the liquid's temperature so as to alter the liquid's surface tension along the jet thus enhancing surface-tension formation of drops from the jet stream is also contemplated while the pulsed laser radiation may also be used on the on the jet to boil, in part or whole, sections of the jet thus separating it in a preferred pattern to enhance drop formation by surface-tension action.

The apparatus of the present invention may also include a mechanism that injects gas bubbles or different-liquid aliquots or solid particles periodically into the jet so as to locally perturb it to enhance surface-tension-driven breakup into drops. The admixing of long-chain-polymer or other additives into the liquid which enhance the jets' resistance to atomization, thereby increasing the Weber Number at which drops can form successfully by surface tension or by jet velocity perturbation is another feature of the invention. Using one or more of the methods described above serve to help protect the jet(s) and its (their) subsequent drops from atomization all the way to their high speed impact with the work substrate.

One method for creating fully-developed flow of a specified Reynolds number upstream of the jet nozzle is to place a pipe of known dimensions upstream of the jet nozzle. If the flow rate through the nozzle is known, one can specify the Reynolds number of the flow in the pipe by properly sizing the pipe diameter. To ensure fully-developed flow, the pipe should be at least 40 pipe diameters long.

For example, the inventors used a nozzle with a flow rate of 1.7 ml/s of water. By placing a pipe with an inside diameter of 585 mm and a length of 60 mm, the inventors ensured a fully-developed flow upstream of the nozzle with a Reynolds number of 4000. It should be noted, however, that there are many ways to create turbulence of a preferred intensity other than employing fully-developed flow in a pipe such as, but not limited to, non-fully-developed flow in a pipe, jet mixing, and rough or textured pipe walls. As well, the introduction of swirling flow upstream of the jet nozzle a can have a destabilizing effect on the jet that leads to a shortened breakup distance. Swirling flow can be effected by using, for example, but not limited to, tangential injection jets or swirl vanes. Any of these other methods can be utilized in the present invention and are considered within the scope of the present invention.

As another alternative, a divergent jet can be used to shorten breakup distance. Divergent jets are those jets that have at least one characteristic dimension that increases with increasing distance from the nozzle. In the case of a divergent jet made from a flat sheet, the width of the jet increases with increasing distance from the nozzle. This type of jet is known as a fan jet. Fan jets can be created by passing fluid through a slit or oval orifice. In the case of a divergent jet made from an annular (hollow cylinder) sheet, the circumference of the annulus increases with increasing distance from the nozzle. This type of divergent jet is known as a cone jet. Cone jets can be created by using a pressure swirl, or "simplex", atomizer or a pintle atomizer. Both of these types of atomizers are well known to those skilled in the art and good examples can be seen in Arthur Lefebvre's 1989 book, "Atomization and Sprays" ISBN 0-89116-603-3 incorporated herein by reference.

In the examples given above, as the width of the fan jet and the circumference of the cone jet increase, the thickness of the liquid sheet decreases. This sheet thinning with increasing distance from the nozzle is a feature of divergent jets. Thin liquid sheets are more unstable than thick liquid sheets and break up into drops more quickly. This is why divergent jets breakup into drops more quickly than non-divergent jets of the same flow rate. In the case of divergent jets, it may not be necessary to introduce turbulence into the flow upstream of the nozzle in order to reduce breakup length to an acceptable value.

The third feature of a novel synergy may be created by combining one or more of the features of a low Weber number with a reduced jet break up distance in order to provide a practical apparatus for creating high-speed liquid droplets without using an external driver. It has been found that unless $t_b$ is made minimum, $l_b$ is so long as to make an impractical tool. For example, a large diameter, round liquid jet moving at high speed with a low Reynolds number flow upstream of the nozzle and a low Weber number may take over a meter to break up into drops. It has also been found that once drops are created, a low Weber number is necessary to allow the drops to travel to the workpiece over an appreciable distance. This feature allows the tool to accommodate workpieces of varying surface geometries where the standoff between the workpiece and the nozzle may vary. Without this feature, it is necessary to control the standoff more precisely than a human operator is generally capable. For example, a high-speed fan jet with a high Weber number may breakup into high-speed drops within five centimeters of the nozzle but those same drops will themselves atomize into small, low-speed, ineffective drops within six centimeters, thus giving a effective working range of one centimeter.

Figure 1:
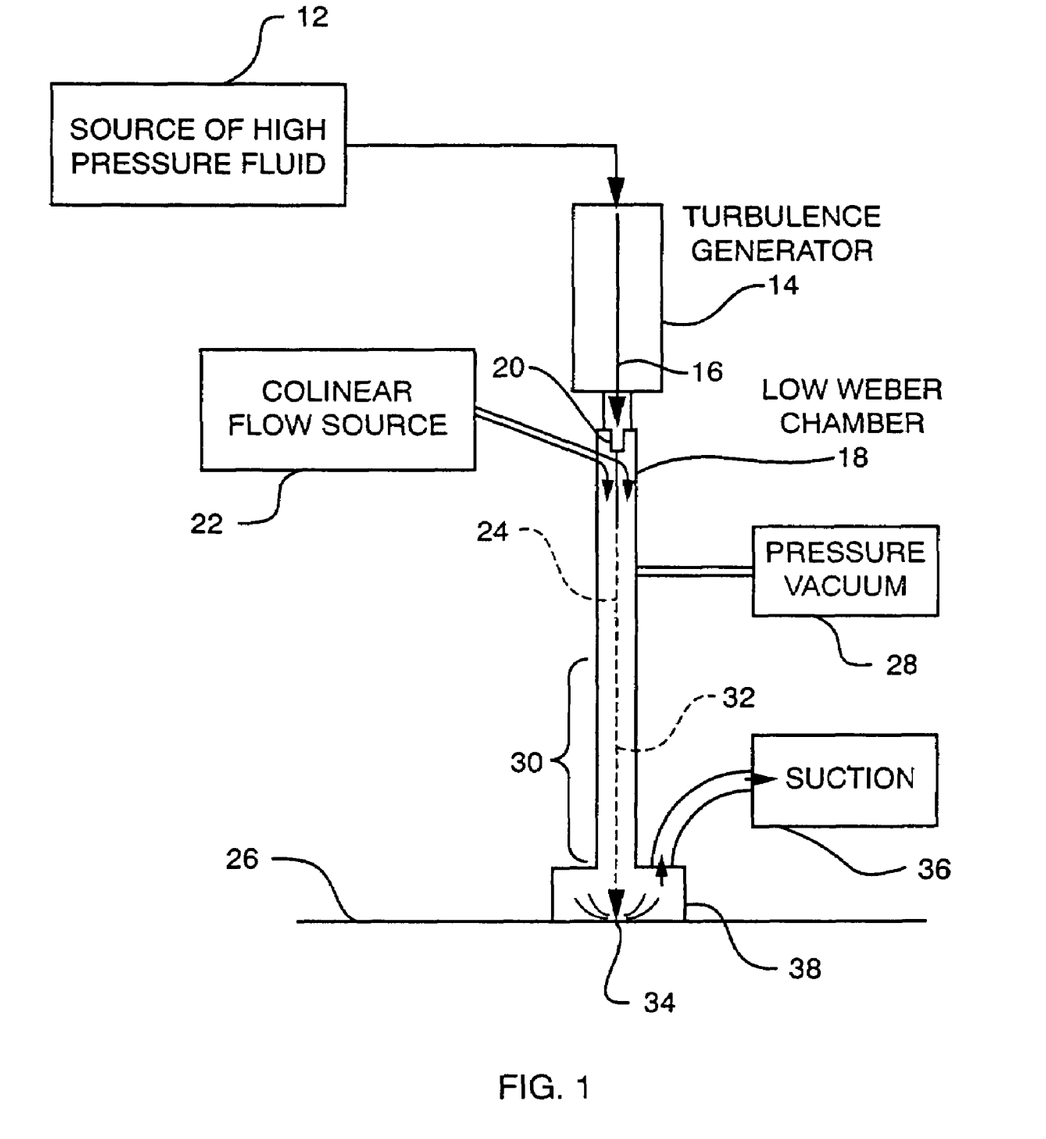
FIG. 1 is a block diagram illustrating one embodiment of an apparatus according to one aspect of the present invention.

By way of example only, FIG. 1 shows a block diagram of a system (10) that may implement the present invention. The system features a source of high pressure liquid 12, such as water, connected to a turbulence generator 14. The turbulence generator may be any form of a device, such as described above, which can introduce random liquid fluctuations of turbulence into the flow of liquid.

The flow of high pressure liquid 16, into which has been introduced turbulence, exits the turbulence generator 14 and enters the low Weber chamber 18 through one or more nozzles or jets 20. Jet 20 introduces a flow of high pressure, turbulence introduced, liquid into the low Weber number chamber 18 in the form of a jet stream, sheet of liquid, cone of liquid, or the like. The liquid may take the form of any shape coming out of an orifice 20 under pressure. Any technology used in an atomizer may be utilized in the present invention.

According to one method of achieving a low Weber number, the system may include a co-linear flow source 22 for introducing a gas, such as a low or other molecular weight gas into the chamber 18 which serves as a "shield" around the liquid stream 24 to reduce drag and to prevent drag from atomizing the liquid jet into an ineffective mist before reaching the work surface 26. Some examples of low molecular weight gases include water vapor and helium. Water vapor has a molecular weight of 18 g/mol and helium has a molecular weight of 4 g/mol. Using these gases in the chamber 18 instead of air could reduce $We_j$ by 38% and 86% respectively.

The low Weber chamber 18 may also be coupled to a pressure (vacuum) device 28 to also reduce $\rho_a$ and, therefore, the effective air drag on the liquid stream 24.

As the liquid stream 24 travels down the low Weber chamber 18 in the region indicated generally at 30, approximately evenly spaced, uniformly shaped liquid droplets 32 form and ultimately strike the work surface 26 at region 34. The water droplets 32 striking the surface 26 of the work piece serve to abrade the work surface and remove any paint, rust, and the like and, if left in place long enough, may even be used to roughen, abrade, or cut through the work surface. A suction device 36 may be connected to a hood or shield 38 to remove both the liquid and any contaminates such as paint, rust, metal, or other workpiece debris. A suction device 36 may be connected to a filter or other device to remove the contaminants and dispose of them properly.

Figure 2:
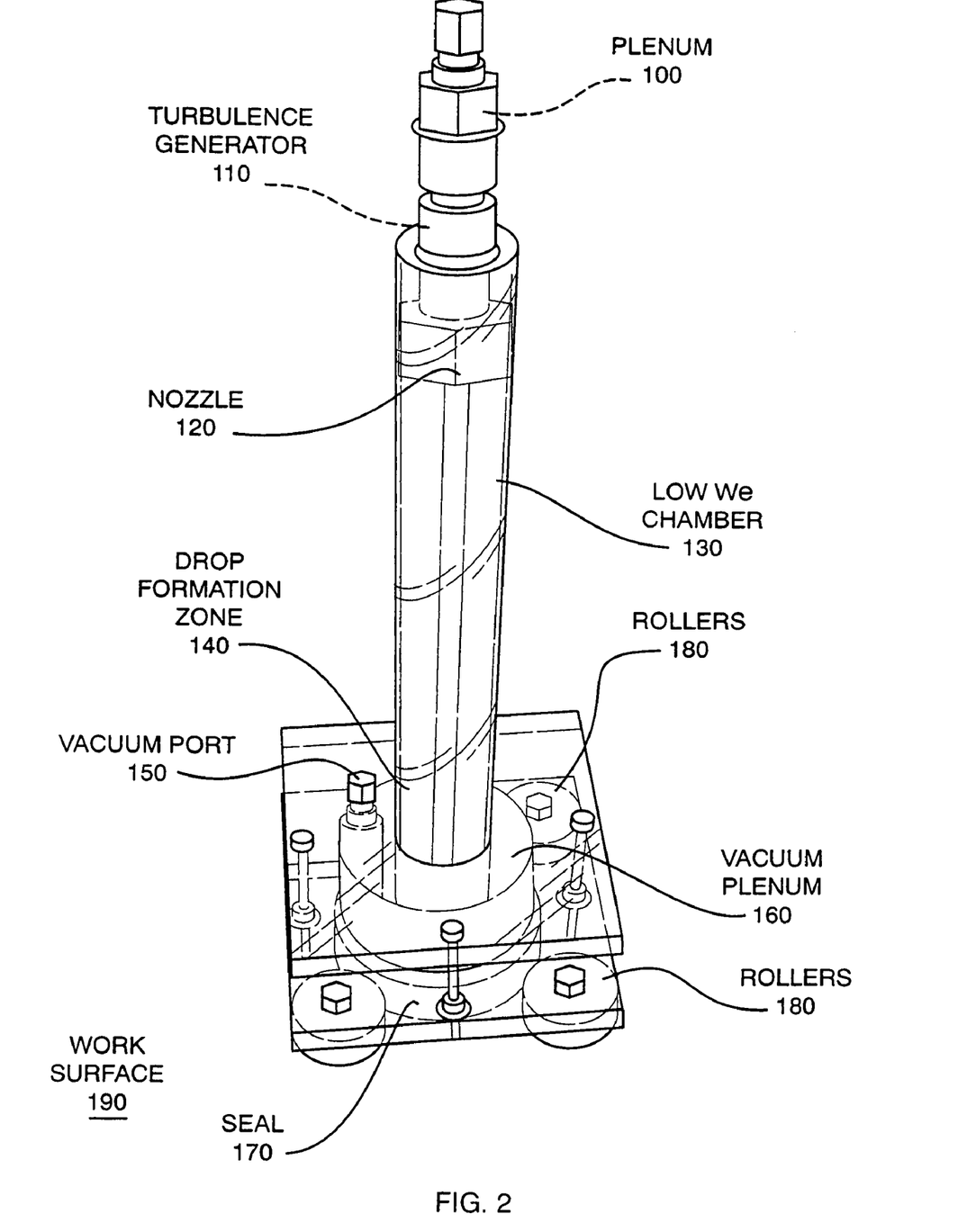
FIG. 2 is a photograph of one apparatus on which the system and method of the present invention may be implemented.
Figure 3:
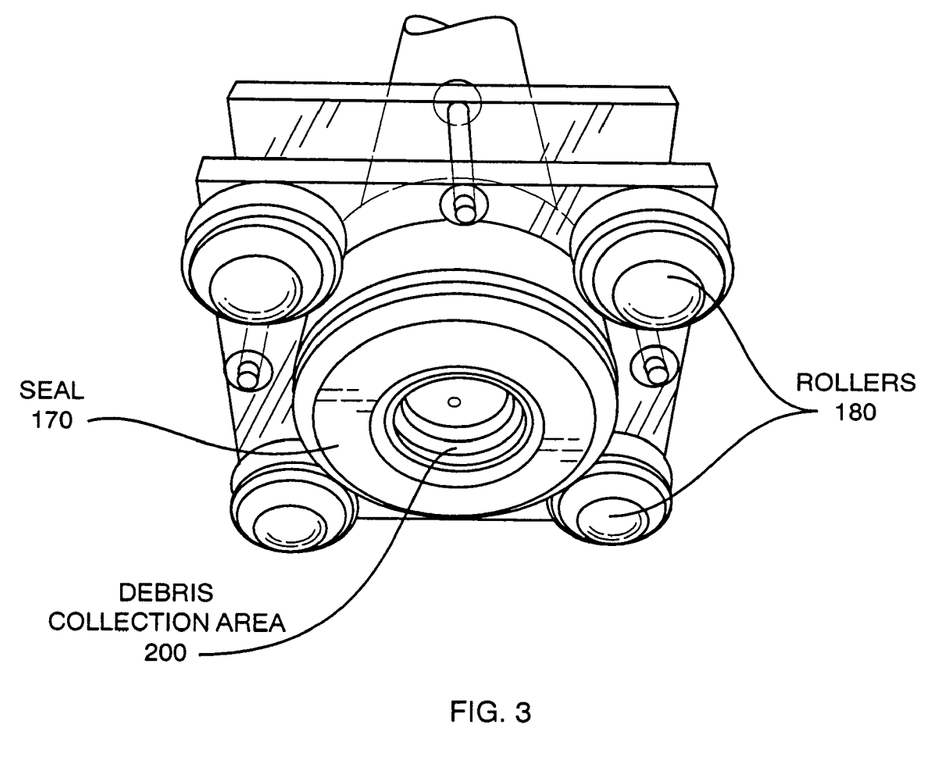
FIG. 3 is a photograph of a portion of the apparatus according to one preferred embodiment of the present invention.
Figure 4A:
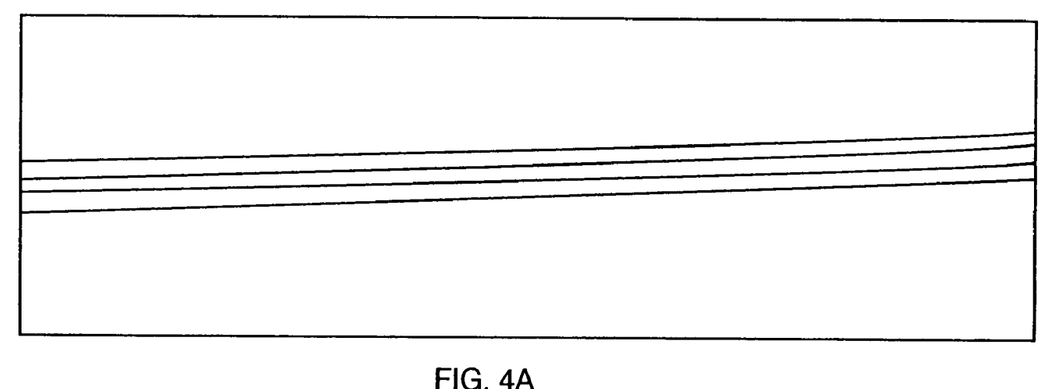
FIGS. 4a-4d are diagrams of liquid streams in varying stages of droplet formation.
Figure 4B:
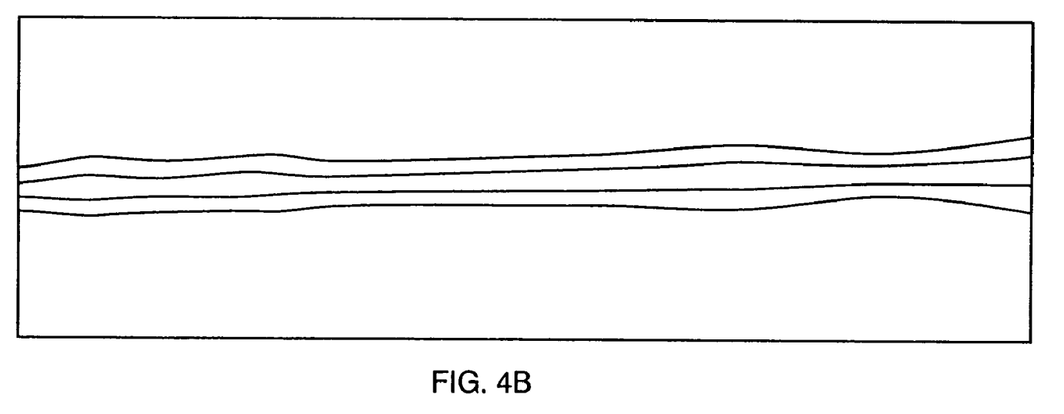
Figure 4C:
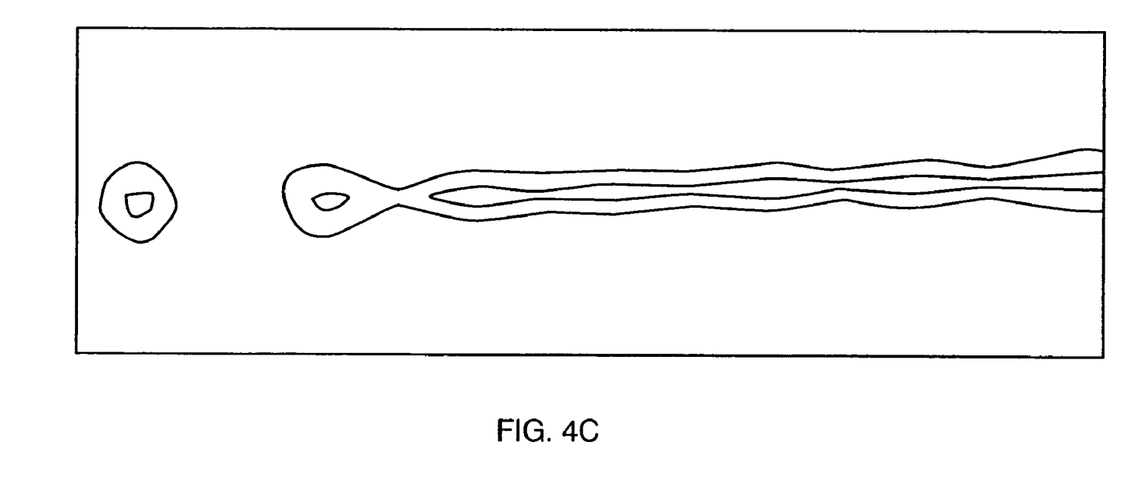
Figure 4D:
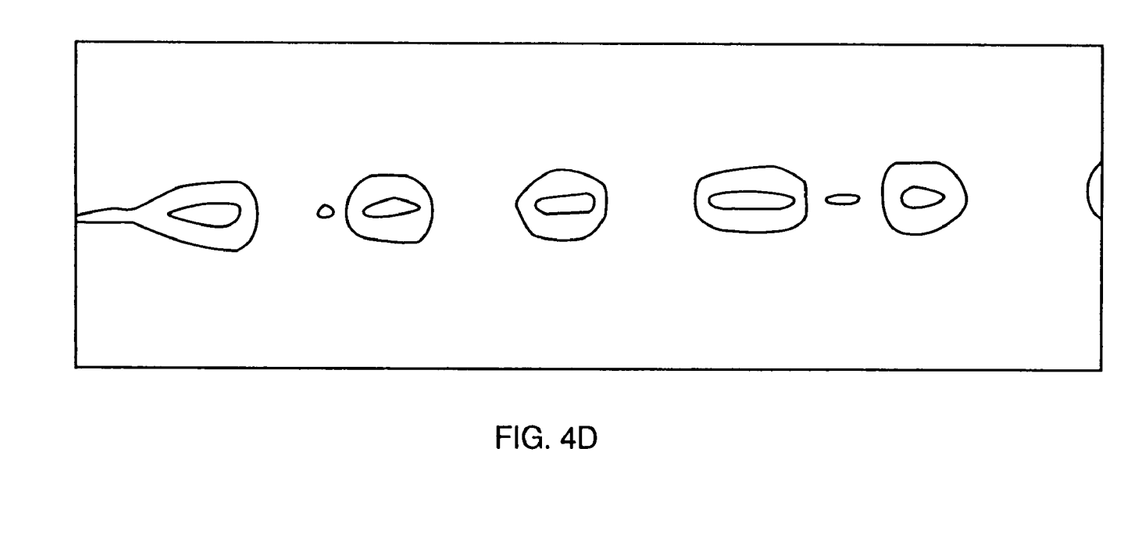
Figure 5:
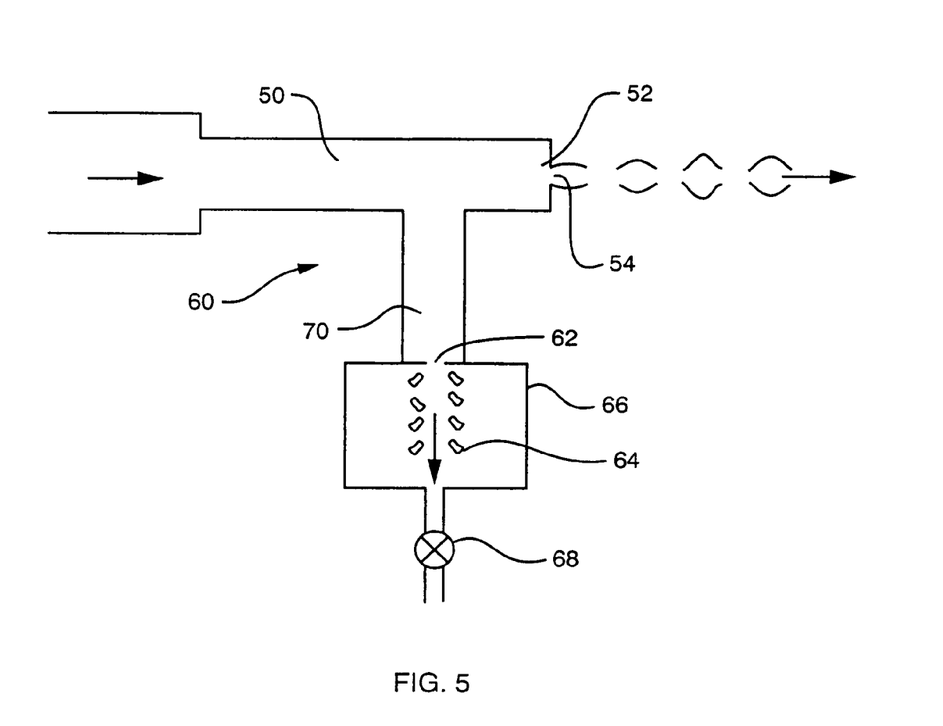
FIG. 5 is a block diagram of a side branch resonator in accordance with one embodiment of the present invention.
Figure 6:
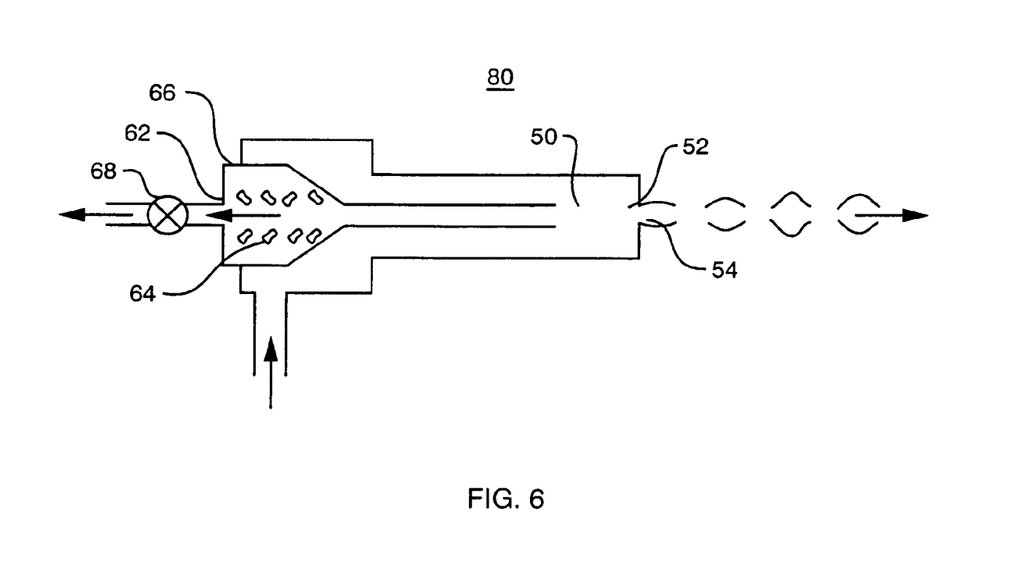
FIG. 6 is a block diagram of a center driving resonator in accordance with another embodiment of the present invention.

FIGS. 2-3 show a realistic tool geometry on which the present method and apparatus may be carried out. High-pressure water is supplied to a plenum (100) before being introduced to the turbulence generator (110). The water is then expelled at high-speed through the nozzle (120). While the tool in FIG. 2 has one nozzle, many nozzles operating in parallel would likely be employed in practice. In addition, one or more nozzles may be mounted on articulating or rotating arms which move parallel to a workpiece surface.

The jet(s) break into drop train(s) inside the low We chamber (130) in which has been created a low enough $We_j$ (in the range of 0-200) so that only slight atomization occurs, if any, before the drops impact on the work surface (190).

A "low" $We_j$ situation in this case is created by low pressure (1-30 kPa absolute) and reduced MW resulting from the mixture of water vapor (MW=18) and/or He (MW=4) present in the low We chamber (130).

Surrounding and communicating with the low We chamber (130) is a vacuum plenum (160) which imposes low pressure on the low We chamber (130). A vacuum port (150) connects the vacuum plenum (160) to a wet vacuum pump (not shown). The vacuum plenum (160) and vacuum pump also serve to lift and carry away the stripped debris and the jets' water flow from the debris collection area (200) through the vacuum port (150) to a debris collector (not shown) which will extract of the waste products. The water, cleaned of debris, is sometimes discharged or sometimes cleaned and returned to the high-pressure water pump (not shown) and then via a high-pressure hose to the plenum (100) to be re-used.

In order to maintain low pressure in the vacuum plenum (160) a seal (170) rides over the work surface (190). A preferred standoff is maintained between the work surface (190) and the seal (170) by a set of rollers (180).

The unit comprised of elements (100) through (200) but excluding (190) is mounted in and to a carriage (not shown) which travels over the work surface (190). The carriage can be one of the conventional types used for steady water-jet stripping or a custom-designed carriage, and may be manipulated manually or by motor drive (i.e. robotic).

Modifications and substitutions by one ordinary skill in the art are considered to be within the scope of the present invention which is not to be limited except by the claims that follow.

The invention claimed is:

1. An apparatus for forming high-speed liquid droplets, comprising:

a source of high-pressure liquid;

a droplet forming chamber, coupled to said source of high-pressure liquid, said droplet forming chamber including therein a low Weber number value, wherein said low Weber number value is created by the act of shielding said high-pressure liquid jet entering said droplet forming chamber from atomizing in ambient gas contained in said droplet-forming chamber in order to reduce the liquid jet's Weber number=$\rho_g V_{rel}^2 d_j/\sigma_j$ (where: $\rho_g$=surrounding gas density; $V_{rel}$=$V_j$−$V_g$; where $V_j$=jet liquid velocity; $V_g$=velocity of gas surrounding the jet; $d_j$=jet diameter; and $\sigma_j$=liquid's surface tension against the gas) to less than a value which causes the jet to atomize into an ineffective fine mist; and a workpiece contacting hood, coupled to said droplet forming chamber, for directing said formed high-speed liquid droplets against a workpiece.

2. The apparatus of claim 1 wherein said high-speed liquid droplets are near-spherical droplets.

3. The apparatus of claim 1 wherein said high-pressure liquid enters said droplet-forming chamber through a jet forming a high-pressure liquid jet.

4. The apparatus of claim 1 wherein said act of shielding is accomplished by at least one act selected from the group of acts consisting of: providing a low density gas with essentially $V_g \approx 0$, as said ambient gas surrounding said liquid jet; providing said gas surrounding the liquid jet at low pressure; providing a combination of low density gas at a low pressure to surround said liquid jet; providing said gas surrounding said liquid jet such that said surrounding gas flows confluently with said liquid jet at a $V_g$ which reduces $V_{rel}$ substantially; providing said surrounding gas as gas rotating in a fluid vortex which has a low pressure core through which said liquid jet passes; providing said surrounding gas wherein the velocity of the surrounding gas parallel to the liquid jet axis ($V_{g,x}$) is approximately zero, while the vortex tangential velocity ($V_{g\theta}$) is substantial; providing said surrounding gas as a gas flow with a generally hollow core; and providing a pressure vacuum in said droplet forming chamber.

5. The apparatus of claim 1 wherein said low Weber number value is accomplished by the act of introducing said high-pressure liquid into said droplet forming chamber through a small jet diameter $d_j$ in order to reduce the Weber number value.

6. The apparatus of claim 1 wherein said low Weber number value is accomplished by the act of introducing said high-pressure liquid into said droplet forming chamber through a jet selected from the group of jets consisting of a divergent jet, a fan jet and a cone jet, in order to reduce the Weber number value.

7. The apparatus of claim 1 wherein said low density gas is provided by an act selected from the group of acts consisting of: providing a low molecular weight gas; and providing a high temperature gas.

8. The apparatus of claim 7 wherein the act of providing a high temperature gas as accomplished by one method selected from the group consisting of: heating the gas with a fuel; heating the gas by chemical reaction such as the combustion of fuel; heating the gas by arc heating to create a plasma; and heating the gas by optical radiation.

9. The apparatus of claim 1 wherein said low Weber number value is generally in the range of 0 to 200.

10. The apparatus of claim 1 wherein said workpiece contacting hood includes a seal against said workpiece.

11. The apparatus of claim 10 wherein said seal is selected from the group consisting of a lip seal, a pneumatic-tube seal, a sponge seal, and a brush seal.

12. The apparatus of claim 10 wherein said workpiece contacting hood includes a carriage configured to hold said seal in a fixed relationship with a surface of said workpiece and to permit rolling or sliding said apparatus over said surface.

13. The apparatus of claim 10 wherein said workpiece contacting hood further includes: a debris-collecting hood to prevent the escape into the environment of impacted formed high-speed liquid droplets and/or debris removed from said workpiece surface; and a vacuum suction device, coupled to said debris-collecting hood, to pick up said liquid and/or debris from said workpiece surface.

14. The apparatus of claim 13 wherein said vacuum suction device is also coupled to said droplet forming chamber, for creating a pressure vacuum in said chamber thereby creating a low Weber number value in said chamber.

15. The apparatus of claim 13 wherein said high-pressure liquid is introduced into said droplet forming chamber through a plurality of jets.

16. The apparatus of claim 15 wherein said plurality of jets are arranged in an asymmetric configuration.

17. The apparatus of claim 15 wherein said plurality of jets are arranged in a linear array configuration.

18. The apparatus of claim 17 wherein said linear array of jets is provided with means so that the orientation of the linear array to a direction of traverse of the apparatus over the surface of a workpiece can he adjusted in order to change a liquid-impacted-swath width.

19. The apparatus of claim 17 wherein said plurality of jets are mounted on one or more arms which rotate in a plane parallel to a surface of said workpiece.

20. An apparatus for forming high-speed liquid droplets, comprising:
a source of high-pressure, high-velocity liquid, said liquid provided at a pressure of at least 100 PSI, said liquid achieving a velocity of at least 25 m/sec at said pressure;
a turbulence generator, coupled to said source of high-pressure liquid, for creating perturbations in said high-pressure liquid; and
a droplet forming chamber, coupled to said turbulence generator.

21. An apparatus for forming high-speed liquid droplets, comprising:
a source of high-pressure, high-velocity liquid, said liquid provided at a pressure of at least 100 PSI, said liquid achieving a velocity of at least 25 m/sec at said pressure;
a droplet forming chamber, coupled to said source of high-pressure liquid, said droplet forming chamber including at least one jet selected from the group consisting of a divergent jet, a fan jet and a cone jet; and
a workpiece contacting hood, coupled to said droplet forming chamber, for directing said formed high-speed liquid droplets against a workpiece.

22. A method for forming high-speed liquid droplets, comprising the acts of:
providing a source of high-pressure, high-velocity liquid, said liquid provided at a pressure of at least 100 PSI, said liquid achieving a velocity of at least 25 m/sec at said pressure;
providing a droplet forming chamber, coupled to said source of high-pressure, high-velocity liquid, said droplet forming chamber including therein a low Weber number value; and
providing a workpiece contacting hood, coupled to said droplet forming chamber, for directing said formed high-speed liquid droplets against a workpiece.

23. A method for forming high-speed liquid droplets, comprising the acts at:
providing a source of high-pressure liquid;
providing a turbulence generator, coupled to said source of high-pressure liquid, for providing a broad spectrum of high frequency white noise having no single characteristic frequency to said high-pressure liquid, for creating perturbations in said high-pressure liquid; and
providing a droplet forming chamber, coupled to said turbulence generator.

24. A method for forming high-speed liquid droplets, comprising the acts of:
providing a source of high-pressure, high-velocity liquid, said liquid provided at a pressure of at least 100 PSI, said liquid achieving a velocity of at least 25 m/sec at said pressure; and
providing a droplet forming chamber, coupled to said source of high-pressure, high-velocity liquid, said droplet forming chamber including at least one jet selected from the group consisting of a divergent jet, a fan jet and a cone jet.

25. A method for creating a train of high-speed, droplets or slugs from a high-speed liquid jet stream comprising the act of: imposing a perturbation of the high-speed jet's velocity $V_j$ so that alternate sections of the jet coalesce to form drops and where the jet velocity perturbation is caused by a pressure perturbation in a plenum upstream of a jet-forming nozzle and where said pressure perturbation is generated by standing pressure waves in the plenum having a pressure anti-node near a jet-forming nozzle entry region, and where the standing pressure wave is supplied with energy from a side-branching resonator located near a velocity antinode of a standing pressure wave in the plenum in the side branching resonant tube, creating a liquid flow that in turn is driven by oscillations of an exit jet from the side-branch resonator through an orifice creating a submerged discharge jet in an adjacent liquid-filled chamber, to make a Strouhal number $St=dj_2/Vj_2\lambda_2$ (where $dj_2$=diameter jet and $Vj_2$=velocity of said jet and $\lambda_2$=wave length of the standing wave in the side-branch resonator) of $0.3 \leq St \leq 0.5$, and wherein said exit jet discharges into a second chamber full of the liquid and having its internal pressure adjusted and controlled by a throttling valve communicating to the environment or to a drain, and wherein the second chamber's pressure cooperates with the side-branch resonator's internal pressure to determine the jet velocity $Vj_2$, and wherein the wave length $\lambda_2$ is established by the length of the side-branch resonator viz $\lambda_2 = n/2$ where n is an odd, whole number so that a velocity antinode exists at the plenum end of the side-branch resonator and a pressure antinode exists at the exit nozzle of said side-branch resonator.

26. The method of claim 25 whereby said method hastens the surface-tension formation of drops from a jet by controlling the turbulence intensity and/or scale in the fluid upstream of the jet-forming nozzle.

27. The method of claim 26 further including the act of setting the Reynolds Number upstream of the jet-forming nozzle=$\rho_l V_l d/\mu_l$ (where: $V_l$ is the fluid velocity relative to the walls of said upstream passage, d is the characteristic dimension of said passage and $\mu_2$ is the viscosity or apparent viscosity of the fluid in said upstream passage) and the passage length to preferred values that increase the rate of surface-tension action without unduly increasing the atomization action of the gas surrounding the jet.

28. The method of claim 27 whereby the act of setting the upstream Reynolds Number to a preferred value includes at least in part; altering the fluid's apparent viscosity by addition of long-chain polymers.

29. The method of claim 26 whereby the act of creating the preferred emergent jet velocity profile includes selecting the length, diameter and Reynolds Number of the passage upstream of the nozzle.

30. The method of claim 27 whereby the act of setting the upstream Reynolds Number to a preferred value includes at least in part altering the fluid's apparent density by forming a multi-phase fluid with solids entrained from the addition of a fine material such as silica, metal or ceramic, or by adding gas bubbles.

31. The method of claim 25 including the act of creating a preferred velocity profile in the jet issuing from the nozzle such that relaxation of the velocity profile, which occurs naturally in the jet, enhances the surface-tension breakup of the jet into droplets.

32. The method of claim 25 further including the act of configuring the bore, entry and exit geometry of the jet-forming nozzle to produce a preferred, emergent jet geometry that enhances the rate of surface-tension breakup of the jet into drops.

33. The method of claim 25 further including varying the flow rate through the nozzle by exciting pressure and/or velocity oscillations at the entry of the jet-forming nozzle using a method selected from the group consisting of piezocrystal-created pressure waves, spark-discharge pressure waves, gas bubble and solid or gel inclusions in the upstream flow.

34. The method of claim 33 whereby exciting pressure arid/or velocity oscillations at the entry of the jet-forming nozzle includes providing periodic geometrical oscillations of the geometry of the upstream plenum arid/or nozzle elements contacting the flow.

35. The method of claim 33 whereby exciting pressure and/or velocity oscillations at the entry of the jet-forming nozzle includes vibrating in space the upstream plenum and/or nozzle to create inertial forces on the fluid.

36. The method of claim 33 further including injecting gas bubbles or different-liquid aliquots or solid particles periodically into the jet so as to locally perturb it to enhance surface-tension-driven breakup into drops.

37. The method of claim 33 further including the admixing of at least one long-chain-polymer or other additives into the liquid to enhance the jets' resistance to atomization, thereby increasing the Weber Number at which drops can form successfully by surface tension or by jet: velocity perturbation.

38. The method of claim 25 further including the act of applying pulsed laser radiation on the jet to alter the liquid's temperature so as to alter the liquid's surface tension along the jet, thus enhancing surface-tension formation of drops from the jet stream.

39. The method of claim 25 further including the act of applying pulsed laser radiation on the jet to boil, in part or whole, sections of the jet thus separating it in a preferred pattern to enhance drop formation by surface-tension action.

40. An apparatus for forming high-speed liquid droplets, comprising:
  a source of high-pressure liquid;
  a droplet forming chamber, coupled to said source of high-pressure liquid, said droplet forming chamber including therein a low Weber number value; and
  a workpiece contacting hood, coupled to said droplet forming chamber, for directing said formed high-speed liquid droplets against a workpiece, said workpiece contacting hood including a seal against said workpiece.

41. An apparatus for forming high-speed liquid droplets, comprising:
  a source of high-pressure liquid; and
  a droplet forming chamber, coupled to said source of high-pressure liquid, said droplet forming chamber including therein a low Weber number value, wherein said low Weber number value is created by the act of shielding said high-pressure liquid jet entering said droplet forming chamber from atomizing in ambient gas contained in said droplet-forming chamber in order to reduce the liquid jet's Weber number according to the formula $\rho_g V_{rel}^2 d_j/\sigma_j$ (where: $\rho_g$=surrounding gas density; $V_{rel}=V_j-V_g$; where $V_j$=jet liquid velocity; $V_g$=velocity of gas surrounding the jet; $d_j$=jet diameter; and $\sigma_j$=liquid's surface tension against the gas) to less than a value which causes the jet to atomize into an ineffective fine mist.

42. An apparatus for forming high-speed liquid droplets, comprising:
  a source of high-pressure, high-velocity liquid, said liquid provided at a pressure of at least 100 PSI, said liquid achieving a velocity of at least 25 m/sec at said pressure; and
  a droplet forming chamber, coupled to said source of high-pressure, high-velocity liquid, said droplet forming chamber including therein a low Weber number value.

43. An apparatus for forming high-speed liquid droplets, comprising:
- a source of high-pressure liquid;
- a turbulence generator, coupled to said source of high-pressure liquid, for providing a broad spectrum of high frequency white noise having no single characteristic frequency to said high-pressure liquid, for creating perturbations in said high pressure liquid; and
- a droplet forming chamber, coupled to said source of high-pressure, high-velocity liquid, said droplet forming chamber including therein a low Weber number value.

44. A method for forming high-speed liquid droplets, comprising the acts of:
- providing a source of high-pressure liquid;
- providing a turbulence generator, coupled to said source of high-pressure liquid, for providing a broad spectrum of high frequency white noise having no single characteristic frequency to said high-pressure liquid, for creating perturbations in said high pressure liquid; and
- providing a droplet forming chamber, coupled to said turbulence generator.

* * * * *